W. T. THURSTON.
NUT LOCK.
APPLICATION FILED DEC. 23, 1913.
1,110,839.
Patented Sept. 15, 1914.
2 SHEETS—SHEET 1.
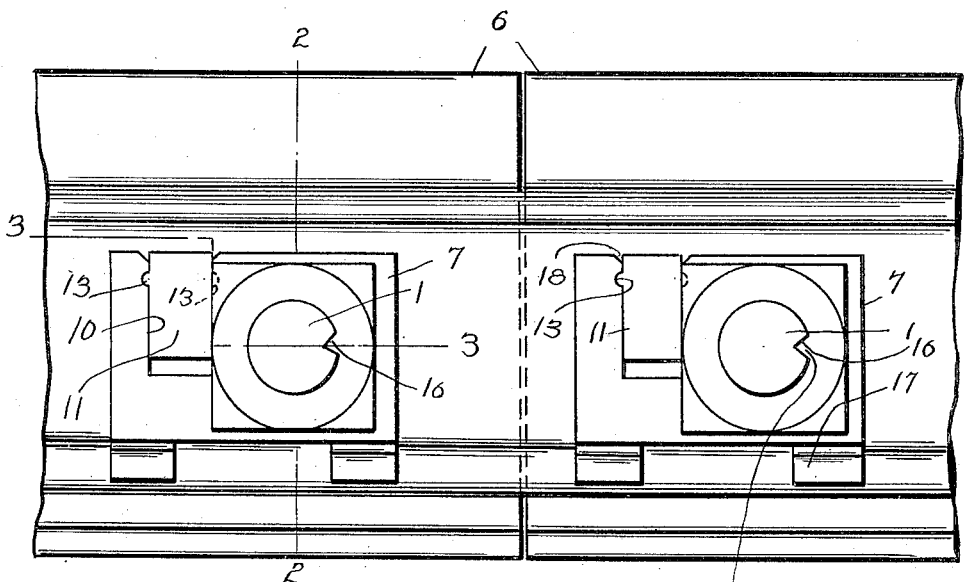
Fig. 1.
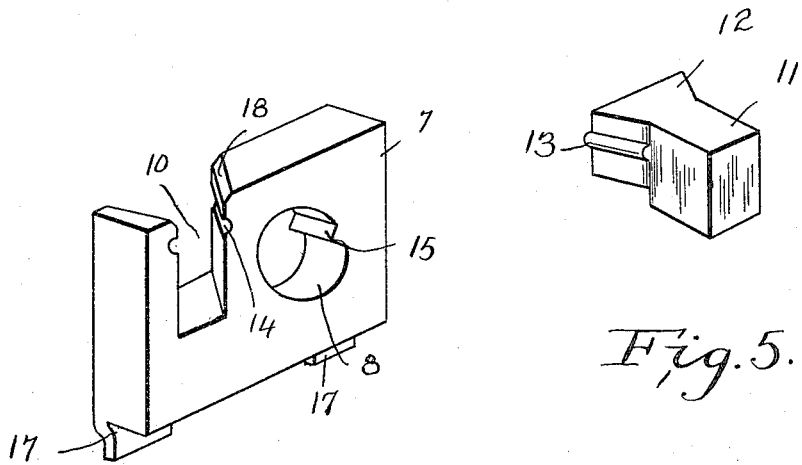
Fig. 4.
Fig. 5.
Witnesses
Inventor
W. T. Thurston W. T. THURSTON.
NUT LOCK.
APPLICATION FILED DEC. 23, 1913.
1,110,839.
Patented Sept. 15, 1914.
2 SHEETS—SHEET 2.
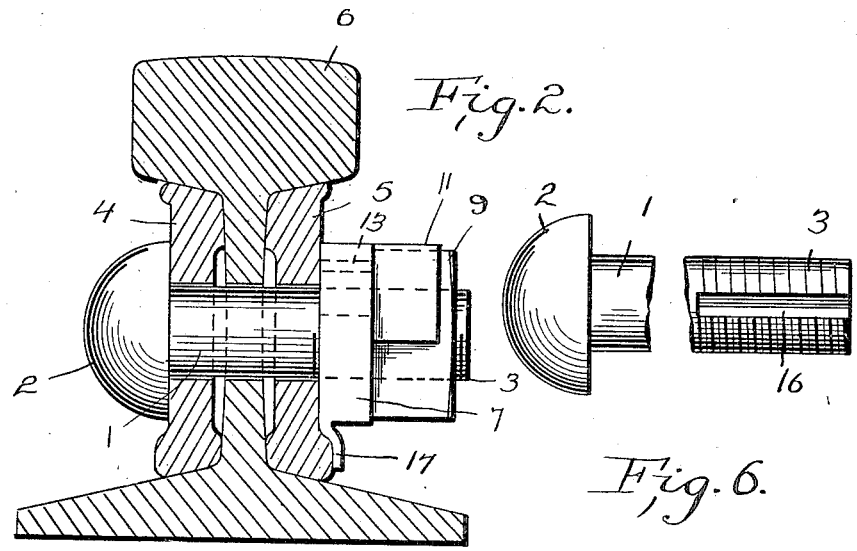
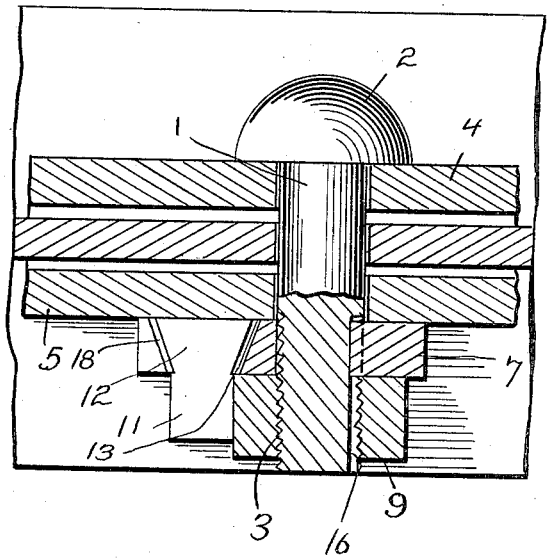
Witnesses
RN Jones
Chas. ?. ?
Inventor
W. T. Thurston
By A. Randolph Jr.
Attorney

UNITED STATES PATENT OFFICE.

WILLIAM T. THURSTON, OF QUINCY, MASSACHUSETTS, ASSIGNOR OF ONE-FOURTH TO JOHN J. LAWLOR, OF CONCORD, MASSACHUSETTS, AND ONE-FOURTH TO FRANK L. JONES, OF MELROSE, MASSACHUSETTS.

NUT-LOCK.

1,110,839.  Specification of Letters Patent.  Patented Sept. 15, 1914.

Application filed December 23, 1913. Serial No. 808,457.

*To all whom it may concern:*

Be it known that I, WILLIAM T. THURSTON, a citizen of the United States, residing at Quincy, in the county of Norfolk and State of Massachusetts, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and has for its object the provision of a simple and efficient device for securely locking a nut on a bolt so that loosening thereof by vibration or from other causes is positively eliminated.

Another object of my invention is to provide a nut lock which consists of a rectangular washer plate constructed and arranged to detachably hold a nut engaging and locking member that is adapted for engagement with one of the faces of the nut so as to positively prevent the rotation of the nut.

A further object of the invention is to provide a nut lock such as described which is simple as to construction and arrangement of parts and cheap to manufacture.

The above and additional objects are accomplished by such means as are illustrated in the accompanying drawings, described in the following specification and then more particularly pointed out in the claims which are appended hereto and form a part of this application.

With reference to the drawings, wherein, I have illustrated the preferred embodiment of my invention as it is reduced to practice, and throughout the several views of which, similar reference numerals designate corresponding parts: Figure 1 is a side elevation illustrating my device as it would appear in assembled operative position and applied to the rails of the track, Fig. 2 is a vertical sectional view taken on line 2—2 of Fig. 1, illustrating my device in assembled locked position, Fig. 3 is a longitudinal sectional view taken on line 3—3 of Fig. 1, Fig. 4 is a detail perspective view of the washer plate forming a part of my invention, Fig. 5 is a detail perspective view of the nut engaging and locking member adapted to be seated within the locked washer plates, and Fig. 6 is a detailed view of the bolt having a longitudinal V-shaped groove formed therein.

In the drawings I have illustrated my nut lock as employed in connection with the tracks of a railway. The numeral 1 designates as an entirety the bolt forming a part of the invention and which is provided with the usual head 2 and screw threaded portion 3. This bolt is inserted through the fish plates 4 and 5 and the rail designated 6 as an entirety.

A rectangular washer plate 7 having an annular bolt receiving bore 8 formed therethrough is mounted upon the screw threaded terminal 3 of the bolt so as to interpose the nut 9 which is of the usual type and the adjacent fish plate 5. The bore 8 in the washer plate 7 is adjacent one end thereof and formed within the other end of the washer plate is a dove-tailed slot designated 10. This dove-tailed slot 10 extends downwardly from the top of the washer plate 7 in a vertical plane and terminates approximately centrally of the upper and lower edges of the plate and is formed so that its enlarged portion is adjacent the fish plate 5 when the washer plate 7 is in position for locking operation. A nut engaging and locking block designated 11 is adapted to be fitted within the dove-tailed slot 10. This block 11 is substantially rectangular in shape and provided along one of its longitudinal faces with an integrally formed dove-tailed portion 12 that is adapted to be fitted within the dove-tailed slot 10 so as to provide for the outward projection of the block 11 that it may engage one of the faces of the nut 9 and serve to hold the nut against rotation and in locked position upon the bolt 1. This block 11 is mounted after the manner described within the dove-tailed slot 10 of the washer plate 7. Before the washer plate is mounted upon the bolt 1 and as a means for preventing the upward movement of the block relative to the washer plate 7 there has been provided a rib 13 that extends horizontally with relation to the vertical axis of the block and is formed integrally with the dove-tailed portion 12 upon opposite sides and adapted for engagement with a recess 14 that is formed on each side of the dove-tailed slot 10. It will thus be seen that the block 11 is prevented longitudinal and lateral movement in other words removal accidentally from the washer plate 7 through the medium of the dove-tailed portion 12, ribs 13 and grooves 14 such as described.

As a means for preventing the rotation of the bolt 1 relatively to the washer plate 7 there has been provided a V-shaped rib 15 that is formed integrally with the inner face of the bore 8 and adapted to be seated within a longitudinally extending V-shaped groove 16 that is formed in the bolt 1.

A pair of spaced curved fish plate flange engaging arms 17 is formed integral with the washer plate 7 at the lower longitudinal face thereof and are adapted for engagement with the lower terminal of the fish plate. These arms 17 serve to prevent rotary movement of the washer plate 7 as they afford a greater bearing surface for the washer plate in engaging the fish plate in a manner such as described.

The method of assembling the device may be described briefly as follows: The bolt 1 is inserted through the fish plates 4 and 5 and the rail 6 so that its screw threaded portion 3 is in a position adapted to receive the washer plate 7 and nut 9. The washer plate 7 is mounted upon the screw threaded portion 3 of the bolt 1 so that the rib 15 is seated within the groove 16 in the bolt and the arms 17 are in engagement with the lower portion of the adjacent fish plate 5 so as to prevent the turning of the washer plate when the nut 9 is screwed upon the portion 3 of the bolt 1 which is the next step in the method of assembling the device. After the nut 9 is tightened to the desired degree the dove-tailed portion 12 of the block 11 is inserted within the slot 10 in the washer plate. The upper edges of the slot 10 are cut away as at 18 thus when the ribs 13 on the beveled portion 12 are moved into engagement with the top of the washer plate adjacent the slot 10 they are permitted further inward movement owing to the cut away portion 18 and may be driven downwardly into engagement with the slots 14 thus locking the block 11 in position in engagement with the adjacent face of the nut 9 and holding the nut against rotation. The dove-tailed portion 12 is formed so as to be inserted between the lower face of the upper portion of the rail 6 and the upper longitudinal face of the washer plate 7 after the washer plate and nut have been mounted in operative position upon the bolt 1. It will thus be seen that the nut engaging and locking block 11 is locked in engagement with the washer plate 7 by forcing the ribs 13 on the dove-tailed portion 12 in engagement with the grooves 14 in the dove-tailed slot 10. This action is permitted by having the upper edges of the groove 10 cut away as at 18 as above stated.

It is apparent that the nut will be held against rotation by the engagement thereof with the block 11 and that the rails of a track will be held in the desired engagement with each other.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. In a device of the character described a bolt having a longitudinal groove formed therein, a washer plate mounted upon said bolt and having a dove-tailed slot formed therein, a nut locking block having a dove-tailed portion formed integral therewith and adapted for engagement with the dove-tailed slot in said washer plate, a rib formed upon said washer plate and adapted for engagement with the groove in said bolt, said dove-tailed slot provided with grooves in its opposed walls, said dove-tailed portion of said locking block having ribs formed thereon adapted for engagement with the grooves whereby the locking block is held in locked engagement with the washer plate and a pair of spaced arms formed integral with the washer plate.

2. A nut lock comprising a rectangular washer plate having an opening therethrough adjacent one end to receive a bolt and a dove tailed slot formed from one longitudinal edge and extending to a point approximately centrally thereof, a nut locking block having a dove tailed portion formed integral therewith, said dove tailed slot having grooves in its opposed faces disposed adjacent the open end of said slot, said dove tailed portion having ribs thereon arranged to fit within said grooves, the upper edges of said dove-tailed slot being cut away, and a pair of curved integral and spaced arms formed on the lower edge of said plate, said nut locking block extending beyond the outer face of said plate and adapted to engage a nut.

In testimony whereof I affix my signature in presence of two witnesses.

WILLIAM T. THURSTON.

Witnesses:
HERMAN L. KEENE,
JOHN E. HARTNEY.

Copies of this patent may be obtained for five cents each, by addressing the "Commissioner of Patents, Washington, D. C."